E. COLLINS.

Reclining-Chairs.

No. 6,180.

Reissued Dec. 22, 1874.

Witnesses.
John Becker.
Fred. Haynes

Edward Collins
by his Attorneys
Brown & Allen

THE GRAPHIC CO. PHOTO-LITH. 39 & 41 PARK PLACE, N.Y.

UNITED STATES PATENT OFFICE.

EDWARD COLLINS, OF NEW YORK, N. Y., ASSIGNOR TO JAMES L. GOODRIDGE.

IMPROVEMENT IN RECLINING-CHAIRS.

Specification forming part of Letters Patent No. 141,121, dated July 22, 1873; reissue No. 6,180, dated December 22, 1874; application filed October 2, 1874.

*To all whom it may concern:*

Be it known that I, EDWARD COLLINS, of New York, in the county and State of New York, have invented an Improved Reclining-Chair, of which the following is a specification:

My invention relates to certain improvements in chairs, whereby the back and seat may be inclined at different angles, and the facing position of the chair may be changed.

The invention consists in, first, the combination of the seat, arms, and back of the chair, the back being hinged at or near the rear edge of the seat, and connected to the arms by rods provided with notched or hooked bars for engagement with projections on the back, whereby the back may be inclined and held in position at different angles; second, the combination, with the seat, of a pedestal arranged forward of the center of the chair, whereby the chair may be swung around in a small space in order to reverse its position; third, the combination, with the chair and pedestal, of a globe-joint of peculiar construction, whereby the chair may be oscillated backward and forward, and held in position when facing in different directions; fourth, the combination, with the seat and legs of the chair, of a pair of levers connected with the legs, and arranged to engage with notches or slots in the arms or sides of the chair for adjusting and holding the seat in different positions.

Figure 1:
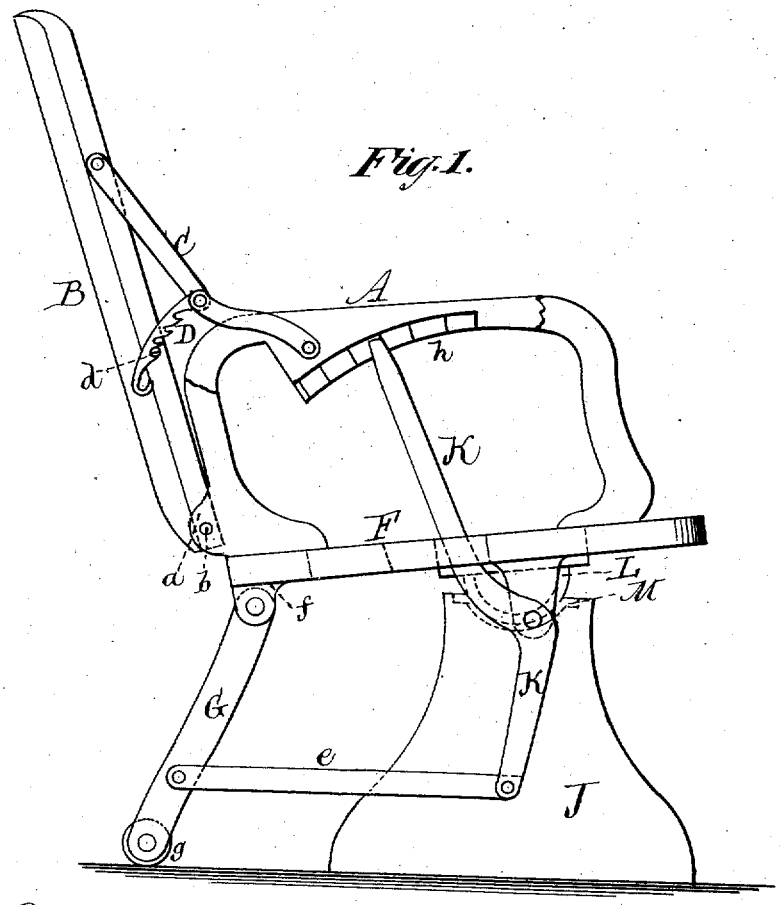
Figure 3:
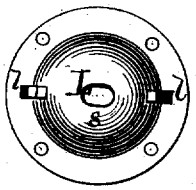
Figure 2:
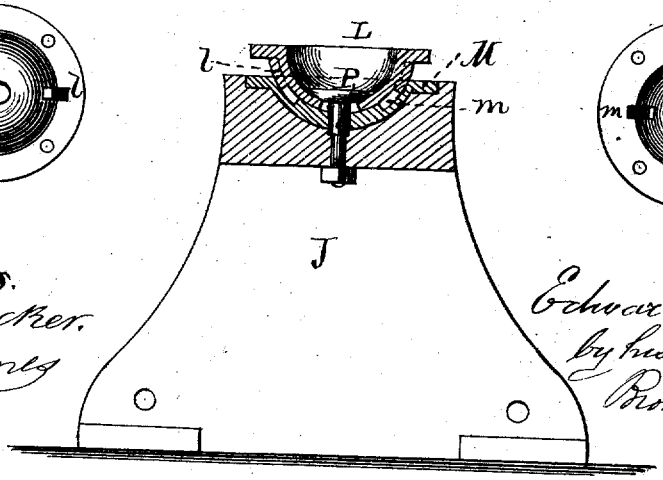
Figure 4:
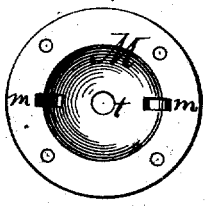

In the accompanying drawing, Figure 1 is a side view of my improved chair, partly in section. Fig. 2 is a central vertical section through the pedestal, globe-joint, and seat. Figs. 3 and 4 are views of the parts composing the globe-joint.

The chair may be constructed of any suitable material, and may be ornamented and upholstered in any desired style. The back B is pivoted to or near the rear edge of the seat by any suitable form of hinge-joint. In the form shown in the drawing the back is attached by means of pins *b* engaging with holes in enlargements or lugs *a* in the rear lower corners of the arms A. The upper portion of the back is connected to the arms by rods or bars C having their upper ends pivoted to the edges of the back B, and their lower ends pivoted to the arms A. About midway between the ends of each bar C is pivoted a bar, D, having hooks or notches on its lower edge for engagement with projections on each edge of the back. These projections may be simply pins or studs *d*, as shown in Fig. 1, or they may be in the form of staples, so as to surround the bars D and prevent their displacement. When the back is to be inclined, the bars D are raised until disengaged from the projections, allowing the back to recede the desired distance, when they are released so as to again engage with the projections and hold the back in the desired position. If found desirable, in order to facilitate the manipulation of the bars D, they may be formed with handles extending forward of their fulcrums, so as to be easily accessible to the occupant of the chair. If desired, the notched or hooked bars D may be pivoted to the back B, and engage with projections on the bars C; but I prefer to connect them in the manner shown. Instead of front legs for the chair, the forward portion of the seat rests upon a pedestal, J, arranged forward of the center of the seat, as shown clearly in Fig. 1. By thus arranging the pedestal the chair may be swung around in a smaller space than would be possible if the pedestal were arranged directly at the center of the seat, thus economizing space in situations where the chair is placed close to a wall, or where a number of chairs are placed near together.

In turning the chair on its pivot to reverse its position, it must always be turned to describe the same semicircular arc, never an entire circle—that is. if the chair is placed near the wall of a car, facing one end of the same. In reversing the position of the chair it is turned with its face or front edge toward the wall, and in reversing it again it is moved in the same path or circle, instead of continuing around to describe an entire circle; consequently the position of the front face or edge of the chair can be reversed in a smaller space with respect to the wall of the car than if pivoted exactly in the center.

The seat F is attached to the pedestal J by a globe-joint, consisting of two bowls, L M, connected by a bolt, P. The bowls are made of cast metal, with flanges for bolting them in place, the lower one to the pedestal and the upper one to the bottom of the seat. The upper bowl L has its central perforation elongated, so as to form a slot, *s*, as shown in Fig. 3. The lower bowl M has its central perforation *t* corresponding with the form and size of the bolt P. This bolt has a rounded head, corresponding with the concave portion of the bowl L, and may have a screw-thread cut on its lower portion, so as to be fastened by a nut. The bolt is passed through the slot *s* before the bowl L is secured to the seat. On the convex surface of the bowl L, near the flange, are two lugs or tongues, *l*, diametrically opposite each other and in line with the direction of the slot *s*. These tongues *l* engage with depressions or grooves *m* in the concave surface of the bowl M. (Shown in Fig. 4.) There may be any desired number of these grooves *m*, but the two shown are sufficient for illustration. When the parts are secured together in place the tongues *l* and slot *s* lie in such a direction as to allow the chair to oscillate backward and forward only, and not from side to side, as in some chairs provided with globe-joints. There is sufficient play between the bowls L M to allow the chair to be raised, so as to disengage the tongues *l* from the grooves *m;* but when the tongues are opposite the grooves the weight of the chair is sufficient to keep them engaged. When it is desired to change the facing position of the chair, or to entirely reverse such position, the chair is raised until the tongues are clear of the grooves, and then rotated on the pin or bolt P as a center until the tongues are opposite or over the desired grooves, when it is released and allowed to fall, so that the tongues *l* will engage with the grooves *m*, and the weight of the chair holds it in position.

For oscillating the seat and inclining it at different angles, I employ a pair of levers, one on each side, having their fulcrums on the seat and their short arms connected with devices bearing on the under side of the seat. One mode of accomplishing this is shown in Fig. 1. On the under side of the seat F, at or near the rear corners, are lugs *f*, to which are pivoted the upper ends of the legs G, on the lower ends of which are caster-wheels *g*. To each leg G is pivoted one end of a connecting-rod, *e*, the other end of which is pivoted to the short arm of a lever, K, which has its fulcrum on the seat or in a lug attached thereto, and its long arm extending upward and engaging with notches *h*, which are preferably formed on the arms A. The notches may be concealed and the upper ends of the levers protected by means of straps, bars, or cushions, in any suitable manner. When the long arms of the levers K are moved forward the legs G are forced backward, and when the long arms of the levers are moved backward the legs G are drawn forward by the action of the connecting-rods *e*. Thus the seat is readily adjusted and held in position at different angles of inclination by means of the levers K. When it is desired to incline the seat the occupant grasps the levers and moves them forward until the desired inclination is reached, when the levers are allowed to engage with the notches, so as to hold the chair in such position. In restoring the seat to a horizontal position the levers are moved backward, so as to draw the legs forward, as before described.

What I claim as new, and desire to secure by Letters Patent, is—

1. The combination of the seat F, arms A, back B, and connecting-bars C, provided with the notched bars D for engagement with projections *d*, substantially as and for the purpose shown and described.

2. In combination with the seat F, the pedestal J, arranged forward of the center, substantially as and for the purpose shown and described.

3. A globe-joint for connecting the seat with the pedestal, consisting of the bowls L M, formed with projections and depressions *l m*, and secured by a bolt, P, substantially as and for the purpose shown and described.

4. The combination, with the seat F and legs G, of the pivoted levers K, connected with the legs, and arranged to engage with notches or slots in the arms or sides of the chair, substantially as and for the purpose described.

EDWARD COLLINS.

Witnesses:
E. R. BROWN,
MICHAEL RYAN.